(12) United States Patent
Urata et al.

(10) Patent No.: US 12,459,282 B2
(45) Date of Patent: Nov. 4, 2025

(54) THERMAL TRANSFER MEDIUM AND INFORMATION RECORDING BODY

(71) Applicant: TOPPAN INC., Tokyo (JP)

(72) Inventors: Seiko Urata, Tokyo (JP); Satoshi Gocho, Tokyo (JP)

(73) Assignee: TOPPAN INC., Tokyo (JP)

( * ) Notice: Subject to any disclaimer, the term of this patent is extended or adjusted under 35 U.S.C. 154(b) by 705 days.

(21) Appl. No.: 17/724,899

(22) Filed: Apr. 20, 2022

(65) Prior Publication Data

US 2022/0243124 A1 Aug. 4, 2022

Related U.S. Application Data

(63) Continuation of application No. PCT/JP2020/038194, filed on Oct. 8, 2020.

(30) Foreign Application Priority Data

Oct. 24, 2019 (JP) ................................ JP2019193371

(51) Int. Cl.
  *B41M 5/385* (2006.01)
  *B41M 5/34* (2006.01)
  (Continued)

(52) U.S. Cl.
  CPC ............ *B41M 5/385* (2013.01); *B41M 5/345* (2013.01); *B42D 25/23* (2014.10); *B42D 25/378* (2014.10);
  (Continued)

(58) Field of Classification Search
  CPC .. B41M 5/345; B41M 5/385; B41M 2205/06; B41M 2205/30; B42D 25/23; B42D 25/378; C09C 1/0015
  See application file for complete search history.

(56) References Cited

U.S. PATENT DOCUMENTS

| | | | |
|---|---|---|---|
| 2009/0029124 A1 | 1/2009 | Washizuka | |
| 2010/0295287 A1* | 11/2010 | Reichert | .................. C09C 3/12 |
| | | | 252/301.36 |
| 2018/0326718 A1 | 11/2018 | Unal et al. | |

FOREIGN PATENT DOCUMENTS

| | | |
|---|---|---|
| EP | 2 020 303 A2 | 2/2009 |
| EP | 2 465 703 A2 | 6/2012 |

(Continued)

OTHER PUBLICATIONS

International Searching Authority, "International Search Report," issued in connection with International Patent Application No. PCT/JP2020/038194, dated Dec. 22, 2020, 5 pages.

(Continued)

*Primary Examiner* — Gerard Higgins
(74) *Attorney, Agent, or Firm* — Foley & Lardner LLP

(57) ABSTRACT

A thermal transfer medium includes a support, and a plurality of ink panels individually made of a thermal transfer ink. The plurality of ink panels include two or more ink panels selected from the group consisting of a first ink panel in which the thermal transfer ink is a first ink containing a specified pigment as a color material, a second ink panel in which the thermal transfer ink is a second ink containing a specified second pigment as a color material, and a third ink panel in which the thermal transfer ink is a third ink containing a specified third pigment as a color material.

2 Claims, 9 Drawing Sheets

(51) Int. Cl.
   *B42D 25/23* (2014.01)
   *B42D 25/378* (2014.01)
   *C09C 1/00* (2006.01)
(52) U.S. Cl.
   CPC ..... *B41M 2205/06* (2013.01); *B41M 2205/30* (2013.01); *C09C 1/0015* (2013.01)

(56) References Cited

FOREIGN PATENT DOCUMENTS

| | | |
|---|---|---|
| EP | 3 409 495 A1 | 12/2018 |
| JP | 3029273 U | 9/1996 |
| JP | 2003-170685 A | 6/2003 |
| JP | 2003-242473 A | 8/2003 |
| JP | 2007-30391 A | 2/2007 |
| JP | 2009-45931 A | 3/2009 |
| WO | WO-2005/062978 A2 | 7/2005 |

OTHER PUBLICATIONS

International Searching Authority, "Written Opinion," issued in connection with International Patent Application No. PCT/JP2020/038194, dated Dec. 22, 2020, 3 pages.
Office Action issued in corresponding Korean Patent Application No. 10-2022-7011486 dated Oct. 28, 2024.
Extended European Search Report issued in connection with EP Appl. Ser. No. 20878872.9 dated Nov. 30, 2022 (9 pages).

\* cited by examiner

THERMAL TRANSFER MEDIUM AND INFORMATION RECORDING BODY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/038194, filed on Oct. 8, 2020, which is based upon and claims the benefit of priority to Japanese Patent Application No. 2019-193371, filed on Oct. 24, 2019; the disclosures of which are incorporated herein by reference in their entireties.

TECHNICAL FIELD

The present invention relates to thermal transfer media which are used for producing personal authentication media, such as passports, identification (ID) cards, tickets, and passbooks, requiring security, and which need to be difficult to counterfeit or falsify, and can facilitate authenticity determination. Furthermore, the present invention relates to information recording bodies produced using these thermal transfer media.

BACKGROUND

As printed matter on which characters or motifs are printed using various methods, there are information recording bodies requiring security, e.g., personal authentication media such as passports and ID cards, credit cards, and passbooks. On such information recording bodies, images having special visual effects may be recorded in addition to facial images and character images, in order to impart the recording bodies with security that creates difficulty for counterfeiting or falsification, authenticity that indicates genuineness, or decorative effects.

As methods of recording images having special visual effects, there is widely known a method in which optical devices, such as holograms or diffraction gratings, are bonded to recording media using transfer foils. These optical devices can provide special visual effects, such as iridescent display, three-dimensional (3D) image display, color changes according to change of observation direction, and pattern changes according to change of observation direction (so-called image changing). Producing these optical devices is considerably difficult because vacuum processing is required. For these reasons, the above optical devices are known to have some effects on anti-counterfeiting and thus have been widely used.

However, with the wide use of these optical devices, similar articles have come to be easily obtained. Furthermore, for production process reasons, it is usually difficult to record individual information, such as personal information, as an individual pattern on the recording media, and thus only the same pattern can be recorded. Therefore, the effects of preventing counterfeiting or falsification using such optical devices have been limited. Also, there has been an issue that, in the case where articles having similar visual effects are substituted for these optical devices, authenticity determination is difficult unless judged by an expert.

Furthermore, due to widespread use of color copiers or home color printers, color printing has come to be easily performed with high accuracy using these devices. Therefore, pattern recording that is difficult to reproduce using these devices has also been performed using, for example, spot color inks, gold and silver inks, or pearl inks having luminescence. However, these inks have also come to be easily available, and therefore, replication of simple patterns is becoming easy. Accordingly, security achieved using the above inks is insufficient.

There is also a method of recording patterns by combining normal color inks with color shifting inks. Such patterns can be formed so that, for example, portions formed using normal color inks and portions formed using color shifting inks appear to be the same color under some observation conditions but appear to be different colors when the observation direction is changed. This method is often used for enhancing decorative effects. This method may also be used for imparting security to articles. However, the normal inks and the color shifting inks are different in texture, and it may be easily found that different inks are combined. Therefore, the information recorded by combining these inks lacks confidentiality and is insufficient from the perspective of security.

PTL 1 describes a method of recording latent images using fluorescent inks. According to this method, latent images are formed by printing colorless fluorescent inks containing fluorescent substances on a card using a printing technique of conventional art, such as offset printing. This method is suitable for printing common latent images on similar types of cards. Such latent images can be used for identifying, for example, whether the card substrate is genuine. However, in order to record individual information, such as personal information, with fluorescent inks, a different printing plate is required to be prepared for each card. Such recording is not practical.

PTL 2 describes a card including a transparent substrate which is sequentially provided thereon with a first colored ink layer which has high light transmissivity, a second colored ink layer which is patterned and has low light transmissivity, and a third colored ink layer which has the same color as the second colored ink layer and has high light transmissivity. When light reflected from this card is observed, the pattern on the second colored ink layer is not visible. When light transmitted through this card is observed, there is produced a contrast in the transmission image due to the difference in transmittance between the portions corresponding to the second colored ink layer and portions other than the portions corresponding to the second colored ink layer. Therefore, the pattern on the second colored ink layer can be visually recognized. However, the technique of PTL 2 requires formation of the first to third colored ink layers and, as in the technique mentioned above, only a common image such as of a motif can be recorded on the same type of cards. In addition, this technique requires the use of a transparent card substrate and limits the range of applications.

[Citation List] [Patent Literature] PTL 1: JP 3029273 U; PTL 2: JP 2007-30391 A.

SUMMARY OF THE INVENTION

The present invention aims to provide a technique that can facilitate determination of authenticity of individual information recording bodies, and can achieve high anti-counterfeiting effects by making it possible to record high-security individual patterns on demand.

According to an aspect of the present invention, there is provided a thermal transfer medium including a support; and a plurality of ink panels individually provided on the support and each made of a thermal transfer ink. In the thermal transfer medium, the plurality of ink panels include two or more ink panels selected from a group consisting of a first color ink panel in which the thermal transfer ink is a first color ink containing a first color pigment as a color material, the first color pigment containing first flake nuclei made of a first transparent material, and a first coating made of a first coloring material and covering the first nuclei, a second color ink panel in which the thermal transfer ink is a second color ink containing a second color pigment as a color material, the second color pigment containing second flake nuclei made of a second transparent material, a second coating made of a first transparent inorganic compound and covering the second nuclei, and a third coating made of a second coloring material and covering the second coating, and a third color ink panel in which the thermal transfer ink is a third color ink containing a third color pigment as a color material, the third color pigment containing third flake nuclei made of a third transparent material, a fourth coating made of a second transparent inorganic compound and covering the third nuclei, and a fifth coating made of a third coloring material and covering the fourth coating, the fourth coating being different from the second coating in optical thickness.

According to another aspect of the present invention, there is provided a thermal transfer medium including a support; and a plurality of ink panels individually provided on the support and each made of a thermal transfer ink. In the thermal transfer medium, the plurality of ink panels include two or more ink panels selected from a group consisting of a first color ink panel in which the thermal transfer ink is a first color ink containing a first color pigment as a color material, the first color pigment containing first nuclei made of synthetic mica, and a first coating made of iron(III) oxide and covering the first nuclei, a second color ink panel in which the thermal transfer ink is a second color ink containing a second color pigment as a color material, the second color pigment containing second nuclei made of synthetic mica, a second coating made of titanium oxide and covering the second nuclei, and a third coating made of iron(III) oxide and covering the second coating, and a third color ink panel in which the thermal transfer ink is a third color ink containing a third color pigment as a color material, the third color pigment containing third nuclei made of synthetic mica, a fourth coating made of silicon dioxide and covering the third nuclei, and a fifth coating made of iron(III) oxide and covering the fourth coating.

According to still another aspect of the present invention, there is provided an information recording body including a recording medium, and a color pattern provided on the recording medium. In the information recording body, the color pattern includes two or more inks selected from a group consisting of a first color ink containing a first color pigment as a color material, the first color pigment containing first flake nuclei made of a first transparent material, and a first coating made of a first coloring material and covering the first nuclei, a second color ink containing a second color pigment as a color material, the second color pigment containing second flake nuclei made of a second transparent material, a second coating made of a first transparent inorganic compound and covering the second nuclei, and a third coating made of a second coloring material and covering the second coating, and a third color ink containing a third color pigment as a color material, the third color pigment containing third flake nuclei made of a third transparent material, a fourth coating made of a second transparent inorganic compound and covering the third nuclei, and a fifth coating made of a third coloring material and covering the fourth coating, the fourth coating being different from the second coating in optical thickness; and individual information is recorded on the color pattern using at least one of the two or more color inks.

According to still another aspect of the present invention, there is provided an information recording body including a recording medium, and a color pattern provided on the recording medium. In the information recording body, the color pattern includes two or more inks selected from a group consisting of a first color ink containing a first color pigment as a color material, the first color pigment containing first nuclei made of synthetic mica, and a first coating made of iron(III) oxide and covering the first nuclei, a second color ink containing a second color pigment as a color material, the second color pigment containing second nuclei made of synthetic mica, a second coating made of titanium oxide and covering the second nuclei, and a third coating made of iron(III) oxide and covering the second coating, and a third color ink containing a third color pigment as a color material, the third color pigment containing third nuclei made of synthetic mica, a fourth coating made of silicon dioxide and covering the third nuclei, and a fifth coating made of iron(III) oxide and covering the fourth coating; and individual information is recorded on the color pattern using at least one of the two or more color inks.

The above thermal transfer medium includes two or more ink panels which are each made of a color ink containing a color pigment as a color material, and which are different from each other at least in either of the structure and the composition of the color pigments. Using this thermal transfer medium, a color pattern can be formed on demand, for example, when producing the information recording body. Thus, individual information, such as personal information, can also be recorded as a color pattern or as a part thereof. In other words, according to the above thermal transfer medium, a pattern having high security can be individually recorded on demand.

Furthermore, the first color pigment does not exhibit an interference color. On the other hand, the second and third color pigments can each exhibit an interference color. Also, since the second and third color pigments are different from each other in optical thickness or composition of the coatings covering the nuclei, conditions for producing strong interference are different between these pigments. Therefore, the color pattern can be a pattern in which, for example, portions formed of different type color inks display the same color when observed with the naked eye in a direction perpendicular to the front surface, and display different colors when observed with the naked eye in a direction oblique to the front surface. In other words, these portions can form latent images which cannot be distinguished from each other when observed with the naked eye in a direction perpendicular to the front surface, but which can be manifested when observed at an inclination. The information recorded as such latent images can be easily recognized with the naked eye by inclining the observation direction. Therefore, adopting the above configuration, authenticity can be easily determined to determine whether the individual information recording bodies are genuine.

Thus, high anti-counterfeiting effects can be achieved.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Figure 1:
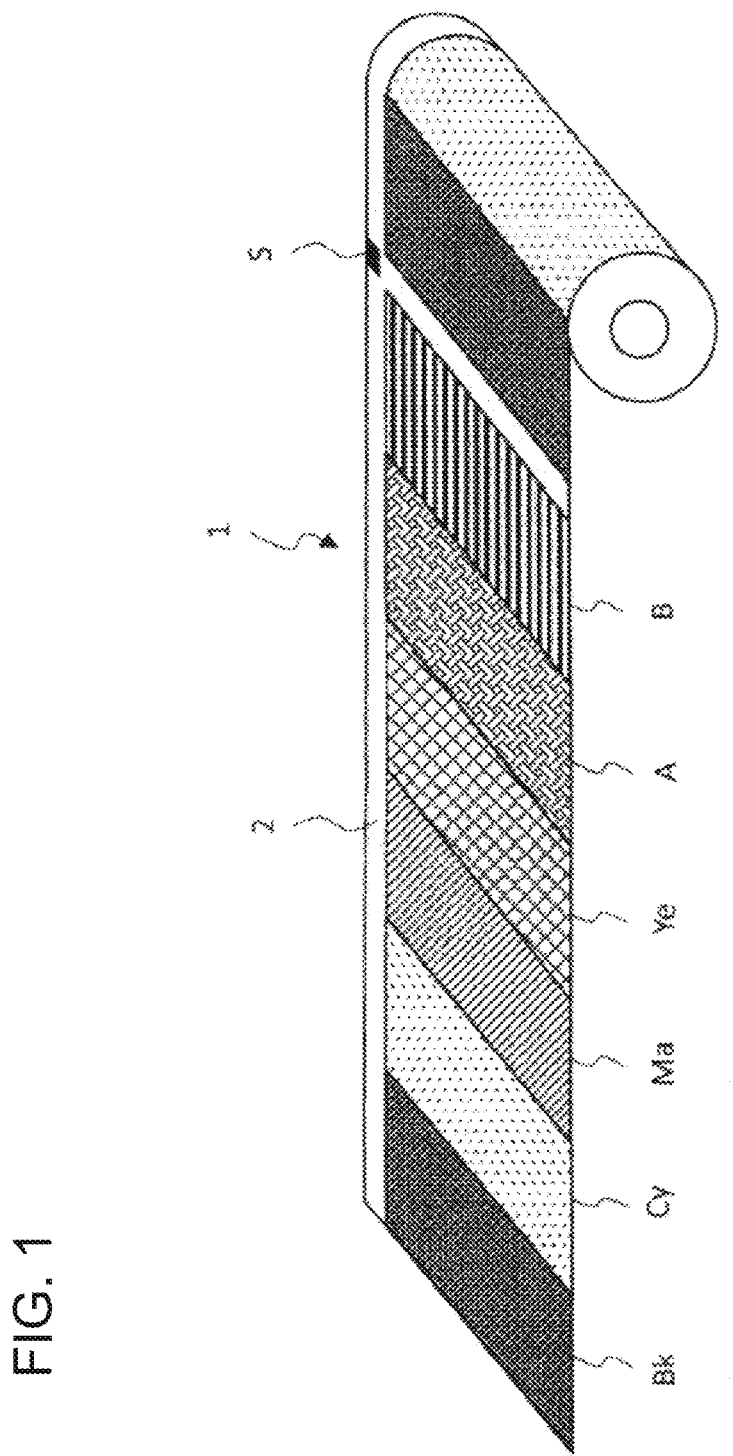
FIG. 1 is a perspective view illustrating a thermal transfer medium according to an embodiment of the present invention.

FIG. 1 is a perspective view illustrating a thermal transfer medium according to an embodiment of the present invention.

A thermal transfer medium 1 shown in FIG. 1 has a strip shape. In FIG. 1, the thermal transfer medium 1 is in the form of a roll with one end thereof unwound. The thermal transfer medium 1 may have other shapes.

The thermal transfer medium 1 includes a support 2, and ink panels Bk, Cy, Ma, Ye, A and B.

The support 2 has a band shape. The support 2 may have other shapes.

The support 2 has sufficient durability against heat generated during transfer. The support 2 may be, for example, a polymer film such as a polyethylene terephthalate film. The support 2 may have a monolayer structure, or may have a multilayer structure.

The ink panels Bk, Cy, Ma, Ye, A and B are provided on one major surface of the support 2. More specifically, on the major surface of the support 2, a plurality of ink panel groups, each of which includes the ink panels Bk, Cy, Ma, Ye, A and B, are arrayed in the in-plane direction which is, herein, the longitudinal direction of the support 2. In each ink panel group, the ink panels Bk, Cy, Ma, Ye, A and B are arrayed in an in-plane direction. Herein, in each ink panel group, the ink panels Bk, Cy, Ma, Ye, A and B are arrayed in this order in the longitudinal direction of the support 2. Also, herein, the ink panels Bk, Cy, Ma, Ye, A and B each have a band shape extending in the width direction of the support 2.

The ink panels Bk, Cy, Ma and Ye are respectively color ink panels of black, cyan, magenta, and yellow. The ink panels Bk, Cy, Ma and Ye are formed of respective thermal transfer inks. The thermal transfer inks herein are color inks containing color materials and binder resins. The color materials contained in each of the ink panels Bk, Cy, Ma and Ye are one or more pigments, one or more dyes, or a combination of these materials. The binder resins contained in each of the ink panels Bk, Cy, Ma and Ye may be, for example, thermoplastic resins, such as polyester resins. The color ink forming the ink panel Bk, the color ink forming the ink panel Cy, the color ink forming the ink panel Ma, and the color ink forming the ink panel Ye respectively exhibit black, cyan, magenta and yellow colors when illuminated with white light.

The ink panels A and B are respectively first and second color ink panels. The first and second color ink panels are each formed of a thermal transfer ink containing color materials and binder resins. The binder resins may be, for example, thermoplastic resins, such as polyester resins.

The thermal transfer ink of the ink panel A is a first color ink containing a first color pigment as a color material. The first color pigment contains first nuclei made of synthetic mica, and a first coating made of iron oxide ($Fe_2O_3$) covering the first nuclei.

The thermal transfer ink of the ink panel B is a second color ink containing a second color pigment as a color material. The second color pigment contains second nuclei made of synthetic mica, a second coating made of titanium oxide ($TiO_2$) and covering the second nuclei, and a third coating made of iron(III) oxide, i.e., $Fe_2O_3$, and covering the second coating.

Dimensions of the ink panels Bk, Cy, Ma, Ye, A and B can be appropriately determined. For example, these dimensions may be determined to match the dimensions and the like of recording regions on a recording medium onto which the thermal transfer inks are transferred from the thermal transfer medium 1.

The thermal transfer medium 1 further includes a sensor mark S. The sensor mark S may be omitted.

The thermal transfer medium 1 may further include backcoat layers, such as a heat resistant layer and a lubricating layer, on the surface of the support 2 facing away from the surface provided with the ink panels Bk, Cy, Ma, Ye, A and B.

The first color pigment has a structure, as mentioned above, in which first nuclei made of synthetic mica are covered with a first coating made of iron(III) oxide. The synthetic mica is a transparent dielectric material in the form of flake particles each having two major surfaces parallel to each other. Therefore, light incident on one major surface of the synthetic mica can undergo repeated reflection within the synthetic mica. However, since the synthetic mica is thick, it causes interference due to repeated reflection therein, which prevents generation of high-intensity interference light. Also, in the first color pigment, the first nuclei made of synthetic mica are covered with a first coating made of iron(III) oxide. Every time the light incident on the first nuclei is reflected by the interface between the first nuclei and the first coating, part of the light is absorbed by the first coating. Therefore, the first color pigment appears reddish brown, which is the color of iron oxide, irrespective of the observation direction. Accordingly, in the color pattern obtained by transferring the color ink onto the recording medium, portions formed of the first color ink also appear reddish brown.

On the other hand, the second color pigment has a structure, as mentioned above, in which second nuclei made of synthetic mica are covered with a second coating made of titanium oxide, which is further covered with a third coating made of iron(III) oxide. In other words, in the second color pigment, the second coating made of titanium oxide is sandwiched between the second nuclei made of synthetic mica and the third coating made of iron(III) oxide. Since the titanium oxide is a transparent dielectric material, light incident on the second coating can be reflected by the interface between the second nuclei and the second coating. Furthermore, the second coating is a thin layer having substantially an even thickness. Accordingly, the light incident on the second coating is reflected by the surface of the second coating and the interface between the second nuclei and the second coating. These reflection surfaces cause interference due to repeated reflection and, consequently, can generate high-intensity interference light. The wavelength of light that causes strong interference varies with optical path length. Furthermore, the optical path length changes according to an observation angle $\theta$. In other words, the interference color changes according to the observation angle $\theta$.

Surfaces of the second color pigment are conformal to surfaces of the second nuclei. In other words, the second color pigment is in the form of flake particles having a thickness direction matching that of the second nuclei. Therefore, in the portions formed of the second color ink in the color pattern obtained by transferring the ink panel B or the color ink onto the recording medium, the second color pigment aligns such that its thickness direction substantially matches the thickness direction of the ink panel B or the thickness direction of the color pattern.

Accordingly, in the color pattern obtained by transferring the color ink onto the recording medium, portions formed of the second color ink exhibit different hues depending on the observation angle $\theta$.

Figure 3:
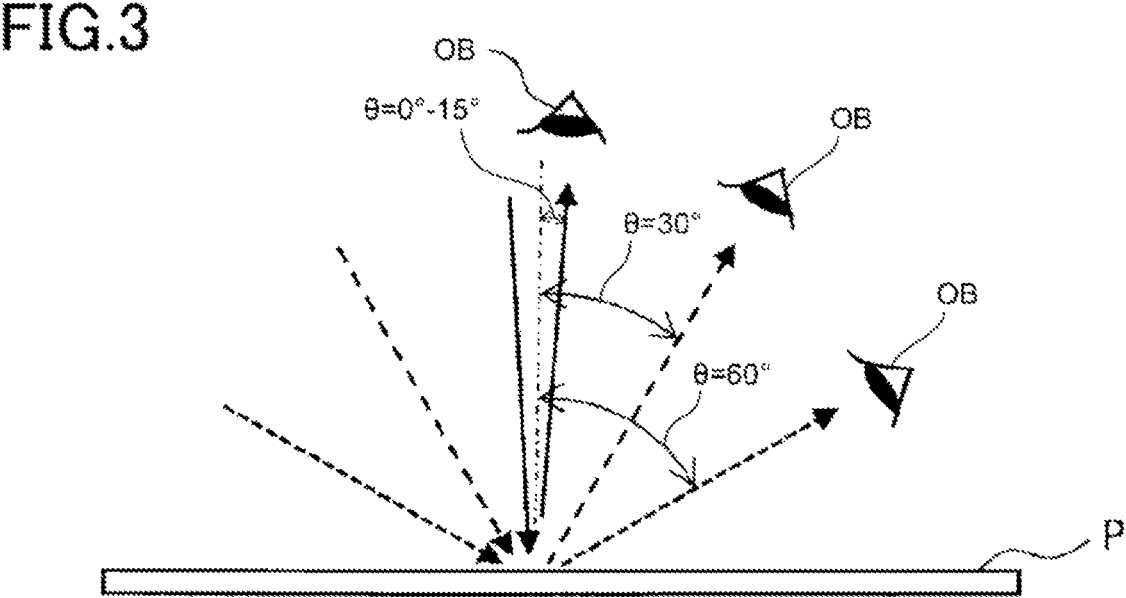
FIG. 3 is a diagram illustrating a state where an observer is observing an information recording body.

For example, as shown in FIG. 3, an observer OB is assumed to observe an information recording body P having a color pattern at an observation angle $\theta$ in the range of 0° to 15°, i.e., in a direction substantially perpendicular to the front surface of the information recording body P. In this case, the portions formed of the second color ink in the color pattern appear reddish brown, which is the color of the iron oxide, producing almost no interference color. When the observation angle $\theta$ is changed to approximately 30°, an interference color becomes visible, i.e., the portions formed of the second color ink in the color pattern become visible as a green color. Then, when the observation angle $\theta$ is changed to approximately 60°, the portions formed of the second color ink in the color pattern become visible as a blue color.

Figure 2:
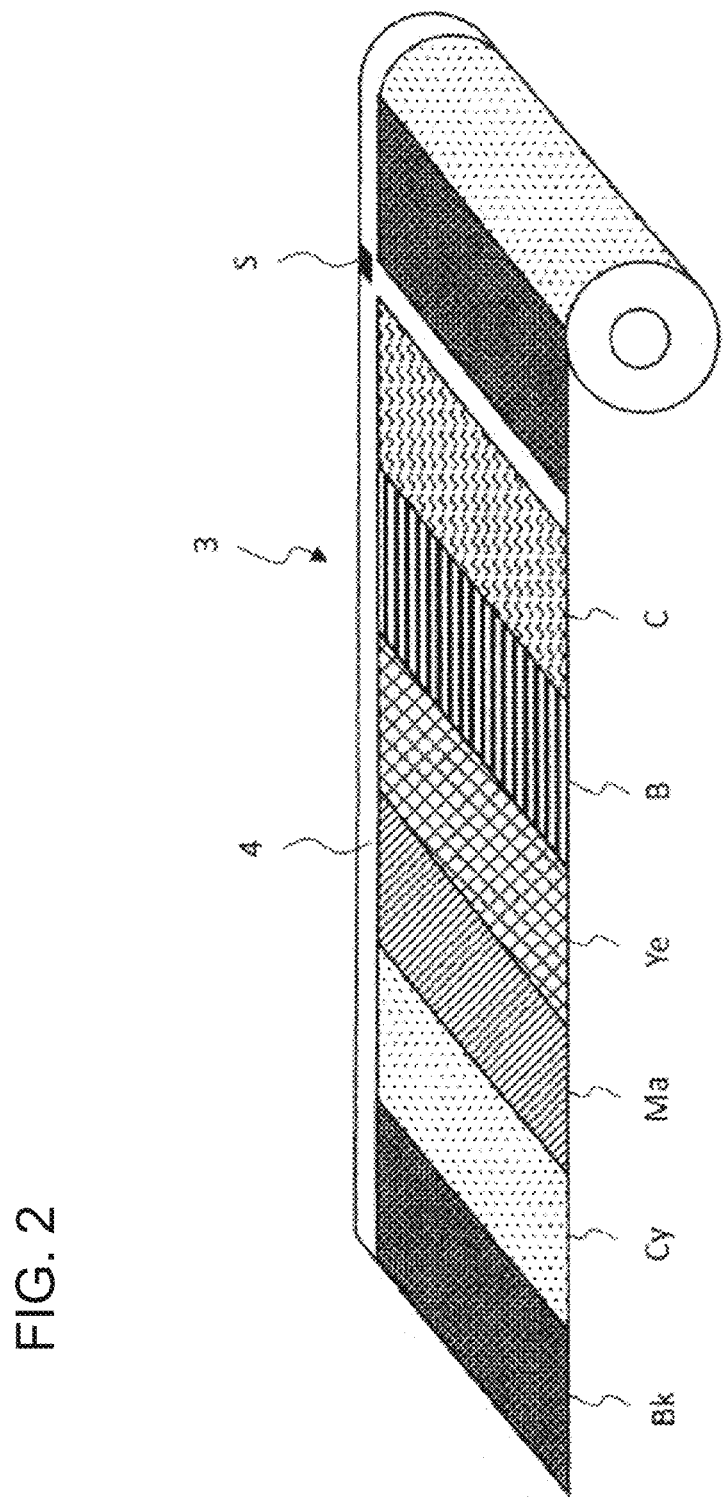
FIG. 2 is a perspective view illustrating a thermal transfer medium according to another embodiment of the present invention.

FIG. 2 is a perspective view illustrating a thermal transfer medium according to another embodiment of the present invention.

A thermal transfer medium 3 shown in FIG. 2 has a strip shape similarly to the thermal transfer medium 1 described above. In FIG. 2, the thermal transfer medium 3 is in the form of a roll with one end thereof unwound. The thermal transfer medium 3 may have other shapes.

The thermal transfer medium 3 includes a support 4, and ink panels Bk, Cy, Ma, Ye, B and C.

The support 4 has a band shape. The support 4 may have other shapes. As the support 4, for example, the support support 2 as described above may be used.

The ink panels Bk, Cy, Ma, Ye, B and C are provided on one major surface of the support 4. More specifically, on the major surface of the support 4, a plurality of ink panel groups, each of which includes the ink panels Bk, Cy, Ma, Ye, B and C, are arrayed in the in-plane direction which is, herein, the longitudinal direction of the support 4. In each ink panel group, the ink panels Bk, Cy, Ma, Ye, B and C are arrayed in the in-plane direction. Herein, in each ink panel group, the ink panels Bk, Cy, Ma, Ye, B and C are arrayed in this order in the longitudinal direction of the support 4. Also, herein, the ink panels Bk, Cy, Ma, Ye, B and C each have a band shape extending in the width direction of the support 4. Specifically, each ink panel group of the thermal transfer medium 3 is similar to the ink panel group of the thermal transfer medium 1, except for including the ink panel C instead of the ink panel A, and the ink panel B is located between the ink panel Ye and the ink panel C.

The ink panel C is a third color ink panel. The third color ink panel is formed of a thermal transfer ink containing color materials and binder resins. The binder resins may be, for example, thermoplastic resins, such as polyester resins.

The thermal transfer ink of the ink panel C is a third color ink containing a third color pigment as a color material. The third color pigment contains third nuclei made of synthetic mica, a fourth coating made of silicon dioxide ($SiO_2$) and covering the third nuclei, and a fifth coating made of iron(III) oxide and covering the fourth coating. Similarly to the first and second nuclei, the third nuclei are in the form of flake particles. Herein, as an example, the third nuclei have a thickness that is substantially the same as that of the second nuclei.

Dimensions of the ink panels Bk, Cy, Ma, Ye, B and C can be appropriately determined. For example, these dimensions may be determined to match the dimensions and the like of recording regions on a recording medium onto which the thermal transfer inks are transferred from the thermal transfer medium 3.

The thermal transfer medium 3 further includes a sensor mark S. The sensor mark S may be omitted.

The thermal transfer medium 3 may further include backcoat layers, such as a heat resistant layer and a lubricating layer, on the surface of the support 4 facing away from the surface provided with the ink panels Bk, Cy, Ma, Ye, B and C.

The third color pigment has a structure, as mentioned above, in which third nuclei made of synthetic mica are covered with a fourth coating made of silicon dioxide, which is further covered with a fifth coating made of iron(III) oxide. In other words, in the third color pigment, the fourth coating made of silicon dioxide is sandwiched between the third nuclei made of synthetic mica and the fifth coating made of iron(III) oxide. Since the silicon dioxide is a transparent dielectric material, light incident on the fourth coating can be reflected by the interface between the third nuclei and the fourth coating. Furthermore, the fourth coating is a thin layer having substantially an even thickness. Accordingly, the light incident on the fourth coating is reflected by the surface of the fourth coating and the interface between the third nuclei and the fourth coating. These reflection surfaces cause interference due to repeated reflection and, consequently, can generate high-intensity interference light. The wavelength of light that causes strong interference varies with optical path length. Furthermore, the optical path length changes according to an observation angle $\theta$. In other words, the interference color changes according to the observation angle $\theta$.

Surfaces of the third color pigment are conformal to surfaces of the third nuclei. In other words, the third color pigment is in the form of flake particles having a thickness direction matching that of the third nuclei. Therefore, in the portions formed of the third color ink in the color pattern obtained by transferring the ink panel C or the color ink onto the recording medium, the third color pigment aligns such that its thickness direction substantially matches the thickness direction of the ink panel C or the thickness direction of the color pattern.

Accordingly, in the color pattern obtained by transferring the color ink onto the recording medium, portions formed of the third color ink exhibit different hues depending on the observation angle $\theta$.

Furthermore, while the second coating covering the second nuclei in the second color pigment is made of titanium oxide, the fourth coating covering the third nuclei in the third color pigment is made of silicon dioxide. Titanium oxide and silicon dioxide have different refractive indices.

Therefore, in the color pattern obtained by transferring color inks onto a recording medium, portions formed of the second color ink and portions formed of the third color ink appear to be the same color when, for example, they are observed substantially perpendicular to the front surface of the information recording body, but appear to be different colors when they are observed at an inclination.

For example, as shown in FIG. 3, when the information recording body P having the color pattern is observed at an observation angle $\theta$ in the range of 0° to 15°, i.e., observed in a direction substantially perpendicular to the front surface of the information recording body P, the portions formed of the second color ink in the color pattern appear reddish brown, which is the color of the iron oxide, producing almost no interference color. When the observation angle $\theta$ is changed to approximately 30°, an interference color becomes visible, i.e., the portions formed of the second color ink in the color pattern become visible as a green color. Then, when the observation angle $\theta$ is changed to approximately 60°, the portions formed of the second color ink in the color pattern become visible as a blue color.

Furthermore, as shown in FIG. 3, when the information recording body P having the color pattern is observed at an observation angle $\theta$ in the range of 0° to 15°, i.e., observed in a direction substantially perpendicular to the front surface of the information recording body P, the portions formed of the third color ink in the color pattern also appear reddish brown, which is the color of the iron oxide, producing almost no interference color. When the observation angle $\theta$ is changed to approximately 30°, an interference color becomes visible, i.e., the portions formed of the third color ink in the color pattern become visible as a green color. However, when the observation angle $\theta$ is changed to approximately 60°, the portions formed of the third color ink in the color pattern remain visible as a green color without producing a great color change.

Figure 4:
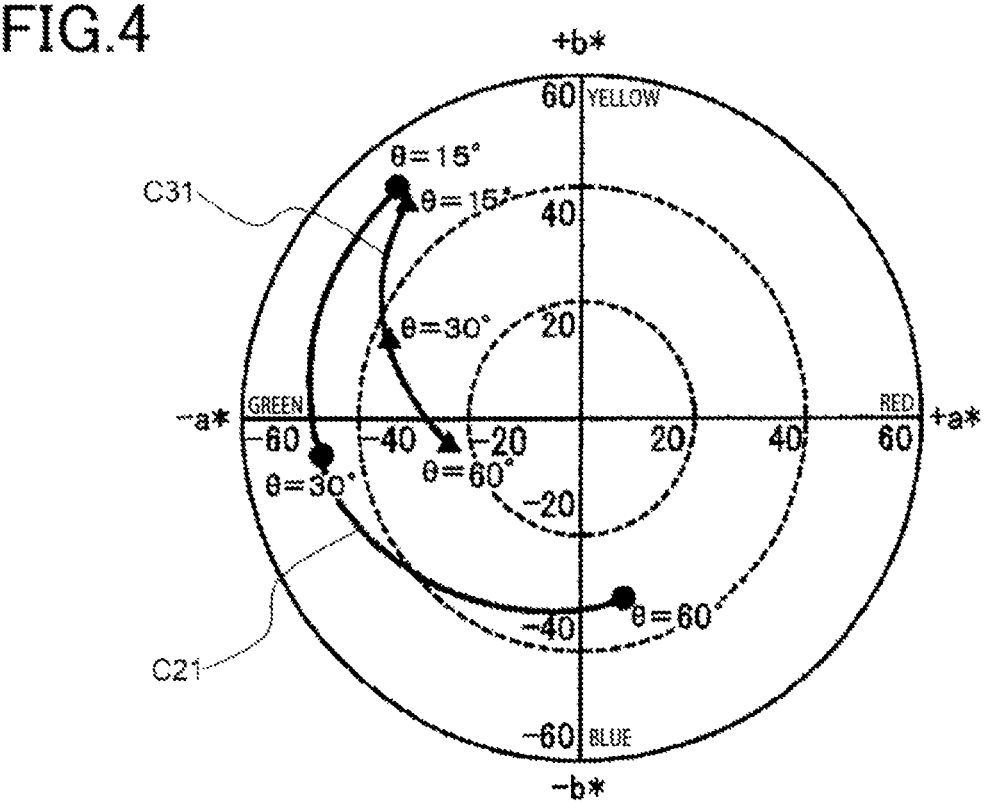
FIG. 4 is a hue diagram obtained for a color pattern related to an example.

FIG. 4 is a hue diagram obtained for a color pattern related to an example. In FIG. 4, a curve C21 indicates a color change according to the observation angle $\theta$ for the portions formed of the second color ink in the color pattern. Also, a curve C31 indicates a color change according to the observation angle $\theta$ for the portions formed of the third color ink in the color pattern.

As described above, the portions formed of the first color ink in the color pattern remain unchanged in color even when the observation angle $\theta$ is changed. The portions formed of the second color ink in the color pattern, when they are observed at an observation angle $\theta$ in the range of 0° to 15°, exhibit only a weak interference color with a strong yellowish hue, and thus the interference color is unnoticeable, blending into the reddish brown color of the iron oxide. In these portions, as the observation angle $\theta$ increases, the interference color has greater effects on the displayed color. When the observation angle $\theta$ is approximately 30°, the interference color becomes visible as a green color, and when the observation angle $\theta$ is approximately 60°, the interference color becomes visible as a blue color. In contrast, the portions formed of the third color ink in the color pattern, when they are observed at an observation angle $\theta$ in the range of 0° to 15°, exhibit an interference color that is unnoticeable similarly to the above. However, as the angle increases, the interference color has greater effects on the displayed color. When the observation angle $\theta$ is approximately 30°, the interference color becomes visible as a green color; however, even when the observation angle $\theta$ is further increased to approximately 60°, there are fewer changes in hue and the interference color appears green.

Figure 5:
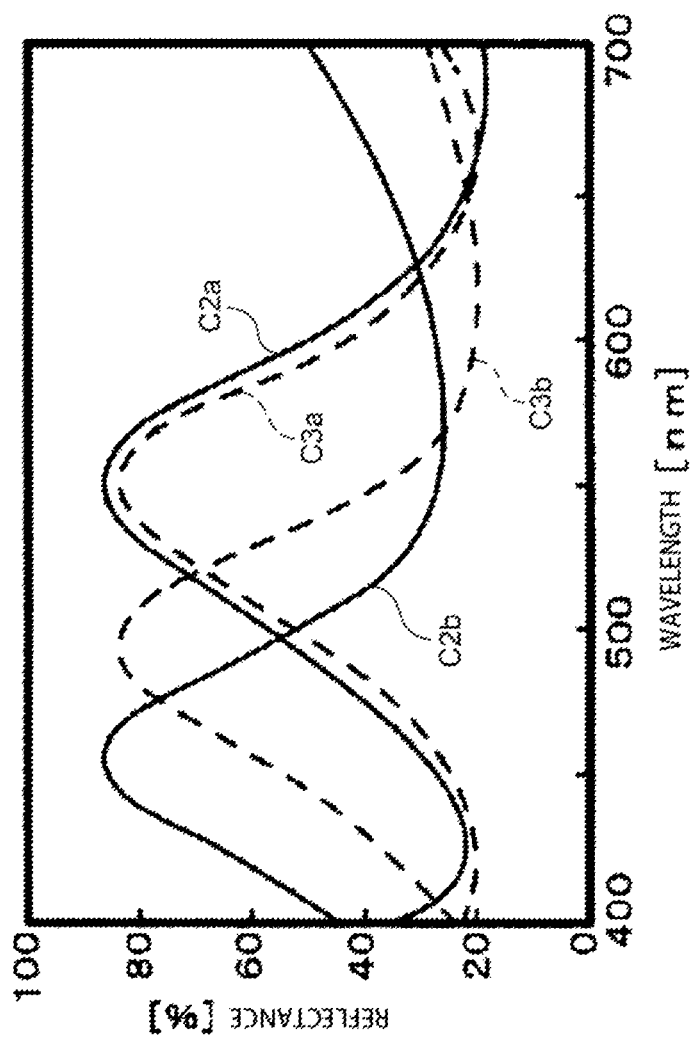
FIG. 5 is a spectral reflectance diagram obtained for a color pattern related to an example.

FIG. 5 is a spectral reflectance diagram obtained for a color pattern related to an example. In FIG. 5, curves C2$a$ and C2$b$ indicate spectral reflectances in portions of the second color ink in a color pattern when the observation angle θ is 15° and 60°. Also, curves C3a and C3b indicate spectral reflectances in portions of the third color ink in the color pattern when the observation angle θ is 15° and 60°.

As shown in FIG. 5, with the change of the observation angle θ, the portions containing the second color pigment and portions containing the third color pigment in the color pattern shift the peaks of reflectance and change the hues. As can be seen, in the portions containing the second color pigment in the color pattern, the amount of shift of the reflectance peak according to the change of the observation angle θ is greater than in the portions containing the third color pigment in the color pattern.

The above embodiments show examples in which increase of the observation angle θ firstly changes the displayed color to green due to the presence of the color pigments, and further changes the displayed color to blue in some situations. However, the displayed colors are not limited to those of the above examples. For example, the thickness of the coating covering the nuclei made of synthetic mica may be changed to change the optical path length, so that, for example, an interference color of red or blue can be exhibited and that a color ink or an ink panel exhibiting a displayed color according to the interference color can be formed.

Figure 6:
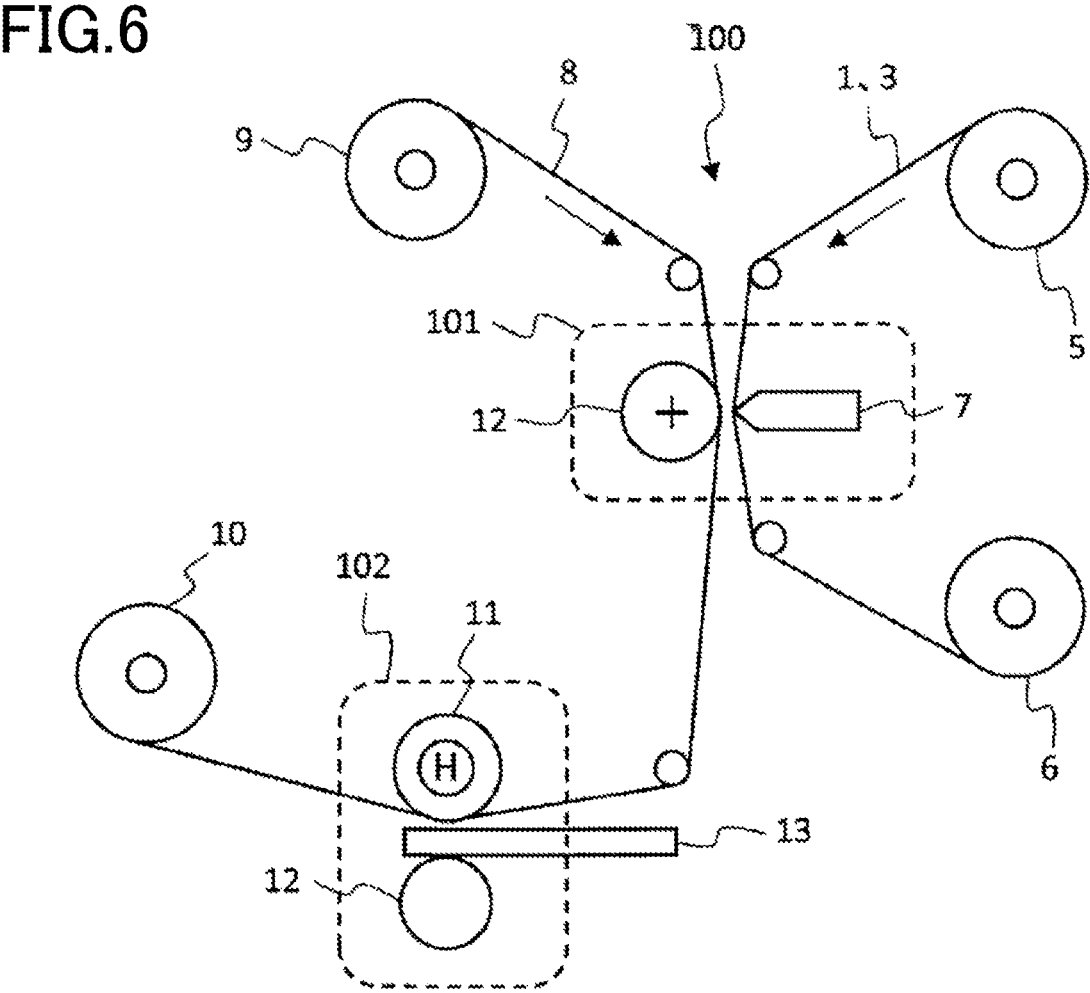
FIG. 6 is a schematic diagram illustrating an example of an indirect transfer recording device that can be used for producing an information recording body.

FIG. 6 is a schematic diagram illustrating an example of an indirect transfer recording device that can be used for producing an information recording body.

The information recording bodies according to the embodiments of the present invention can be produced using the thermal transfer media described above and a thermal transfer printer. FIG. 6 shows an example in which an indirect transfer type printer serves as a thermal printer.

In an indirect transfer recording device 100 shown in FIG. 6, the thermal transfer medium 1 is unwound from an unwinding roll 5, passed between a thermal head 7 and a platen roller 12 in a primary transfer section 101 that performs thermal transfer printing to an intermediate transfer film 8, and then wound on a take-up roll 6. Furthermore, the intermediate transfer film 8 is unwound from an unwinding roll 9, passed between the thermal head 7 and the platen roller 12 in the primary transfer section 101, then passed between a heat roller 11 and a platen roller 12 in a secondary transfer section 102 that performs thermocompression transfer to a recording medium 13 that is a target of transfer, and then wound on a take-up roll 10.

In the primary transfer section 101, a pattern such as of color images or characters is transferred from the ink panels Bk, Cy, Ma and Ye of the four colors black, cyan, magenta and yellow of the thermal transfer medium 1 onto an overlay layer, which can also serve as an image-receiving layer, of the intermediate transfer film 8, and at the same time, a color pattern is transferred from the ink panels thereof containing the color pigments as color materials. The intermediate transfer film 8 on which the patterns are formed is conveyed to the secondary transfer section 102 and thermocompression-bonded to the recording medium 13 by the heat roller 11, so that the patterns formed in the primary transfer section 101 are transferred to the recording medium 13 together with the overlay layer. The pattern such as of color images and characters and the color pattern can have any shape and can be arranged at any position by appropriately controlling the operation of the thermal head 7. Therefore, any individual information can be recorded on the intermediate transfer film 8 and then on the recording medium 13.

Figure 7:
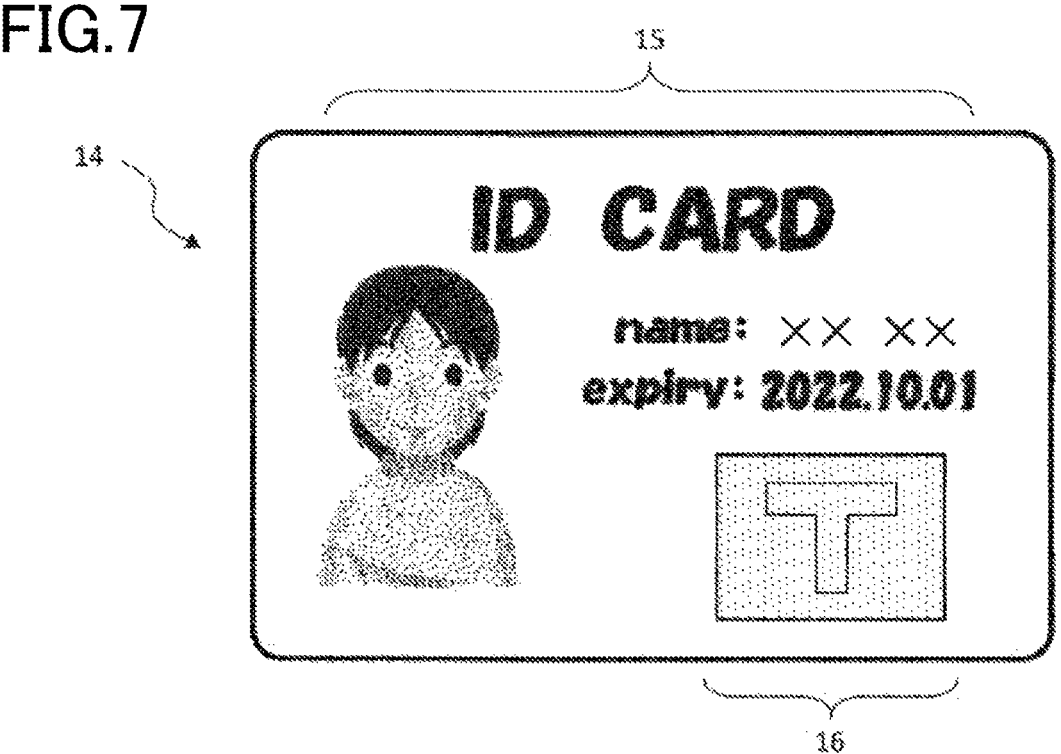
FIG. 7 is a plan view illustrating an information recording body according to an embodiment of the present invention.

FIG. 7 is a plan view illustrating an information recording body according to an embodiment of the present invention.

An information recording body 14 shown in FIG. 7 has a shape of a card such as an ID card. There is no particular limitation in the shape of information recording bodies as long as they have flat recording surfaces. For example, they may have a sheet-like shape or a booklet-like shape. On the information recording body 14, there is formed a pattern 15, which is transferred from the ink panels Bk, Cy, Ma and Ye of the four colors black, cyan, magenta and yellow, to display color images, characters, and the like, and a color pattern 16 which is a combination of patterns transferred from ink panels containing two types of color inks that contain color pigments as color materials.

Figure 8:
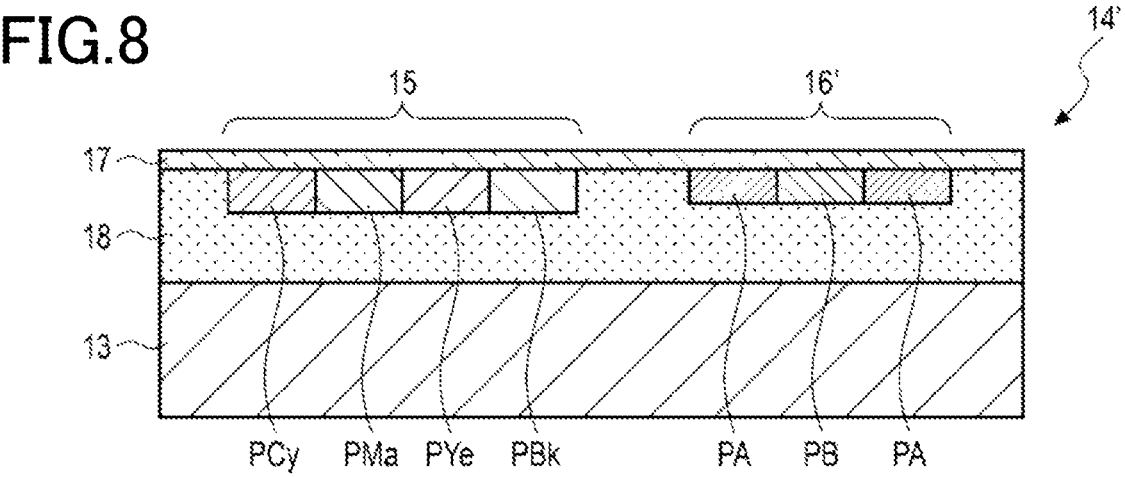
FIG. 8 is a schematic cross-sectional view illustrating an example of a structure that can be adopted for the information recording body shown in FIG. 7.

FIG. 8 is a cross-sectional view illustrating an example of a structure that can be adopted for the information recording body shown in FIG. 7.

FIG. 8 shows an information recording body 14' on which a color pattern 16' is formed through an indirect transfer recording process using the thermal transfer medium 1 shown as an example in FIG. 1.

The information recording body 14' includes a recording medium 13 as a substrate, an adhesive layer 18, the pattern 15, the color pattern 16', and an overlay layer 17.

The recording medium 13 is a card made of plastic. The recording medium 13 may be in other forms, such as a sheet form. Materials used for the recording medium 13 are not particularly limited. For example, materials used for the recording medium 13 may be polymers such as plastics, paper, metal, or combinations thereof.

The adhesive layer 18 is provided on the recording medium 13. The pattern 15 and the color pattern 16' are provided on the adhesive layer 18. The adhesive layer 18 is made of an adhesive. The adhesive layer 18 may be omitted.

The pattern 15 is a pattern transferred from the thermal transfer medium 1 onto the intermediate transfer film to display color images, characters, and the like. The pattern 15 is formed by combining patterns PBk, PCy, PMa and PYe. The patterns PBk, PCy, PMa and PYe are patterns transferred from the thermal transfer medium 1 onto the intermediate transfer film, and further transferred to the recording medium 13 from the intermediate transfer film. The patterns PBk, PCy, PMa and PYe are respectively formed of the color inks of the ink panels Bk, Cy, Ma and Ye.

The color pattern 16' is formed by combining a first color pattern PA which is formed of the first color ink containing the first color pigment as a color material, with a second color pattern PB which is formed of the second color ink containing the second color pigment as a color material. The first and second color patterns PA and PB are patterns transferred from the thermal transfer medium 1 onto the intermediate transfer film, and further transferred from the intermediate transfer film to the recording medium 13. The first and second color patterns PA and PB are respectively formed of the first color ink of the ink panel A and the second color ink of the ink panel B.

The overlay layer 17 is provided on the adhesive layer 18, the pattern 15, and the color pattern 16'. The overlay layer 17 is transferred onto the adhesive layer 18 from the intermediate transfer film together with the pattern 15 and the color pattern 16'. The overlay layer 17 may be made of, for example, a transparent polymer such as an epoxy resin. The overlay layer 17 may be omitted.

Figure 10A:
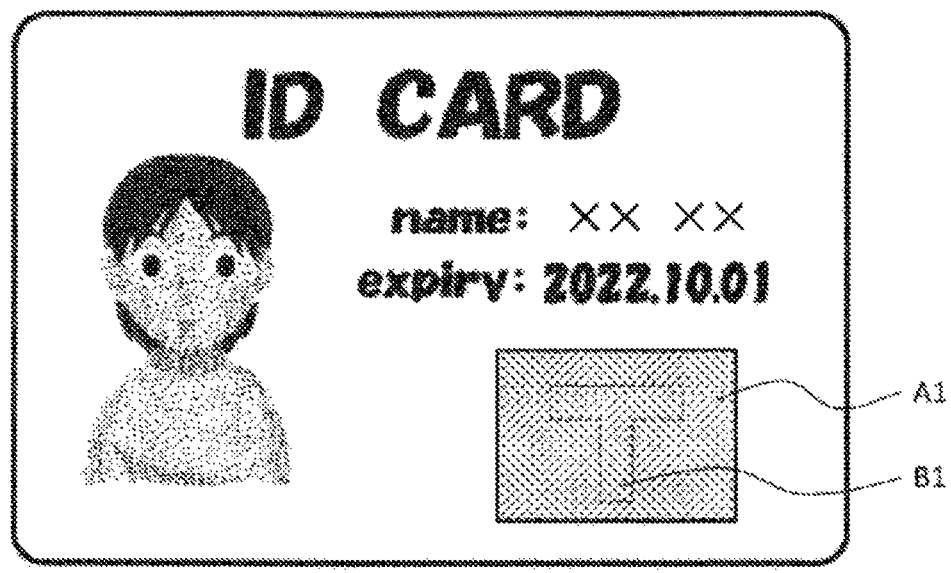
FIG. 10A is a diagram showing an image displayed when the information recording body adopting the structure of FIG. 8 is viewed in a direction substantially perpendicular to the front surface.

FIG. 10A is a diagram showing an image displayed when the information recording body adopting the structure of FIG. 8 is viewed in a direction substantially perpendicular to the front surface.

For example, when the observation angle θ is 0°, the first and second color patterns PA and PB both appear reddish brown, which is the color of the iron oxide. Therefore, an image B1 (T-shaped image herein) displayed by the second color pattern PB cannot be distinguished from an image A1 displayed by the first color pattern PA, and thus latent images can be formed.

Figure 10B:
FIG. 10B is a diagram showing an image displayed when the information recording body adopting the structure of FIG. 8 is viewed at an observation angle of 30°.

FIG. 10B is a diagram showing an image displayed when the information recording body adopting the structure of FIG. 8 is viewed at an observation angle of 30°.

When this information recording body 14' is viewed in a state where it is inclined by approximately 30° as shown in FIG. 10B, the image displayed by the first color pattern PA appears to be the same as the image A1 displayed when it is viewed at an observation angle of 0°. In other words, the image displayed by the first color pattern PA does not produce a change that can be perceived, but remains unchanged in reddish brown. In contrast, the image displayed by the second color pattern PB intensifies the interference color and changes the reddish brown image B1 to a green image B2. Accordingly, change in the observation conditions between the state of observing the images in a direction perpendicular to the front surface, and the state of observing them at an inclination of about 30°, can make the T-shaped image invisible or visible as a green color.

Such an image change can be used, for example, as a security function for determining authenticity. It should be noted that the shape of the second color pattern PB is not limited to a T shape, but may be, for example, a pattern of any individual information such as a name or ID number.

Figure 9:
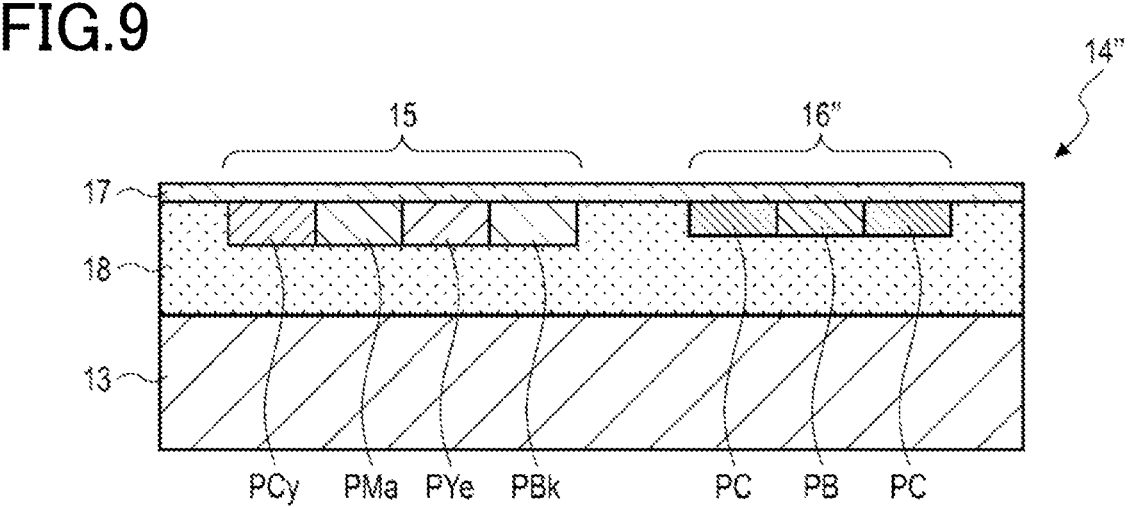
FIG. 9 is a schematic cross-sectional view illustrating another example of a structure that can be adopted for the information recording body shown in FIG. 7.

FIG. 9 is a schematic cross-sectional view illustrating another example of a structure that can be adopted for the information recording body shown in FIG. 7.

FIG. 9 shows an information recording body 14" on which a color pattern 16" is formed through an indirect transfer recording process using the thermal transfer medium 3 shown as an example in FIG. 2.

The structure of the information recording body 14" is basically the same as that of the information recording body 14'. However, the color pattern 16" is formed by combining a second color pattern PB which is formed of the second color ink containing the second color pigment as a color material, with a third color pattern PC which is formed of the third color ink containing the third color pigment as a color material. The overlay layer 17 is transferred onto the adhesive layer 18 film, together with the pattern 15 and the color pattern 16".

Figure 11A:
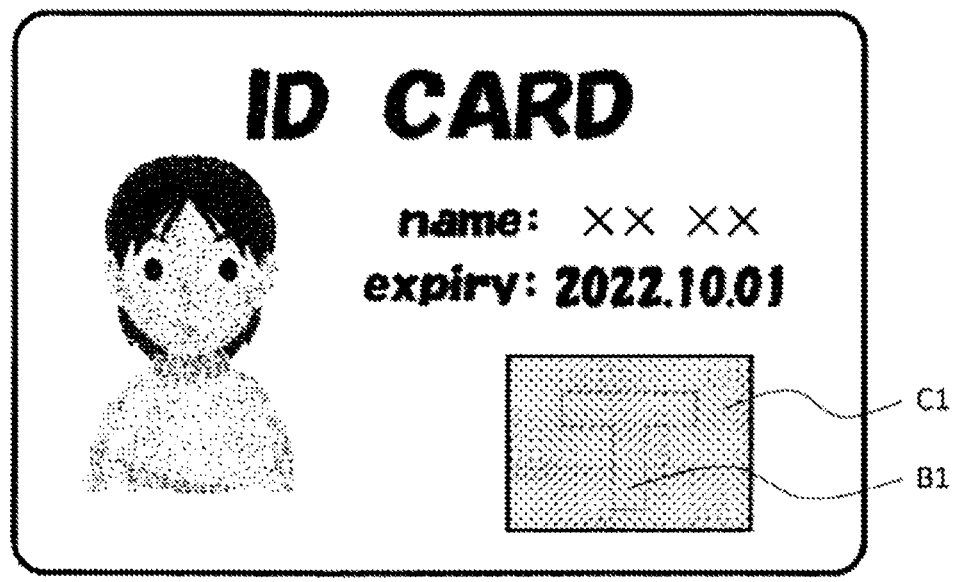
FIG. 11A is a diagram showing an image displayed when the information recording body adopting the structure of FIG. 9 is viewed in a direction substantially perpendicular to the front surface.

FIG. 11A is a diagram showing an image displayed when the information recording body adopting the structure of FIG. 9 is viewed in a direction substantially perpendicular to the front surface.

For example, when the observation angle θ is 0°, the second and third color patterns PB and PC both appear reddish brown, which is the color of the iron oxide. Therefore, an image B1 (T-shaped image herein) displayed by the second color pattern PB cannot be distinguished from an image C1 displayed by the third color pattern PC, and thus latent images can be formed.

Figure 11B:
FIG. 11B is a diagram showing an image displayed when the information recording body adopting the structure of FIG. 9 is viewed at an observation angle of 30°.

FIG. 11B is a diagram showing an image displayed when the information recording body adopting the structure of FIG. 9 is viewed at an observation angle of 30°.

When this information recording body 14" is viewed in a state where it is inclined by approximately 30° as shown in FIG. 11B, the image displayed by the second color pattern PB intensifies the interference color and changes into a green image B2 from the reddish brown image B1. On the other hand, the image displayed by the third color pattern PC also intensifies the interference color and changes the reddish brown image C1 to a green image C2. The images B2 and C2 have substantially the same color and form latent images. In other words, when the observation angle is changed from 0° to 30°, the image displayed by the second color pattern BP and the image displayed by the third color pattern PC produce a color change, but remain as latent images.

Figure 11C:
FIG. 11C is a diagram showing an image displayed when the information recording body adopting the structure of FIG. 9 is viewed at an observation angle of 60°.

FIG. 11C is a diagram showing an image displayed when the information recording body adopting the structure of FIG. 9 is viewed at an observation angle of 60°.

When this information recording body 14" is viewed in a state where it is inclined by approximately 60° as shown in FIG. 11C, the image C2 displayed by the third color pattern PC has a color that is not changed greatly and remains green. In contrast, the image displayed by the second color pattern PB changes from the green image B2 to a blue image B3. Consequently, a T-shaped image becomes visible. Accordingly, change in the observation conditions between the state of observing the images in a direction perpendicular to the front surface, the state of observing them at an inclination of about 30°, and the state of observing them at an inclination of about 60°, can produce color change in the latent images between reddish brown and green, or can manifest the T-shaped blue image.

Such a change of images can be used, for example, as a security function for determining authenticity. It should be noted that, as mentioned above, the shape of the second color pattern PB is not limited to a T shape, but may be, for example, a pattern of any individual information.

According to the embodiments described above, individual information can be recorded on a recording medium by forming a color pattern on an information recording body. The color pattern can be formed on the recording medium on demand. Thus, according to the embodiments described above, a pattern having high security can be individually recorded on demand.

Furthermore, the image displayed by the color pattern can be changed, for example, between latent images and manifest images by changing the observation angle. Use of such a change in image as a security function can facilitate authenticity determination for detecting whether an individual information recording medium is genuine.

Therefore, according to the above embodiments, high anti-counterfeiting effects can be achieved.

The thermal transfer media and the information recording bodies described above can be variously modified.

The thermal transfer medium shown in FIG. 1 includes first and second color ink panels. The color pattern of the information recording body obtained using this thermal transfer medium contains first and second color inks. On the other hand, the thermal transfer medium shown in FIG. 2 includes second and third color ink panels. The color pattern of the information recording body obtained using this thermal transfer medium contains second and third color inks. Thermal transfer media may include first to third color ink panels. Furthermore, color patterns of information recording bodies may contain first to third color inks.

The first nuclei do not have to be made of synthetic mica as long as they are made of a first transparent material and are in a flake shape. The second nuclei do not have to be made of synthetic mica as long as they are made of a second transparent material and are in flake shape. The third nuclei do not have to be made of synthetic mica as long as they are made of a third transparent material and are in flake shape. The first to third transparent materials may be mica other than synthetic mica, or may be a transparent material other than mica, which may be, for example, a transparent inorganic compound other than mica.

The same material may be used for the first to third transparent materials, or the first to third transparent materials may be different from each other. It is preferred that the first to third transparent materials are the same material.

The first to third nuclei are preferred to have an average dimension L in the range of 0.1 μm to 0.9 μm, and more preferably in the range of 0.2 μm to 0.7 μm, in a direction perpendicular to the thickness direction. The first to third nuclei are preferred to have a ratio between a thickness d and the above average dimension L, as expressed by d/L, in the range of 0.004 to 0.18, and more preferably in the range of 0.008 to 0.14. It should be noted that the average dimension L is obtained by capturing images of numerous nuclei, measuring areas of the major surfaces of the nuclei in a direction perpendicular to their thickness directions, and calculating the diameter of a circle having an area equal to an average of the areas of the major surfaces.

The second coating may be a layer made of a material other than titanium oxide, as long as it is made of a first transparent inorganic compound and has surfaces conformal to surfaces of the second nuclei. The fourth coating may be a layer made of a material other than silicon dioxide, as long as it is made of a second transparent inorganic compound and has surfaces conformal to surfaces of the third nuclei.

The first and second transparent inorganic compounds may each be a transparent inorganic dielectric material or may each be a transparent inorganic conductive material. Examples of the first and second transparent inorganic compounds may include $Sb_2O_3$ (refractive index n=3.0), $FeO_3$ (n=2.7), $TiO_2$ (n=2.6), CdS (n=2.6), $CeO_2$ (n=2.3), ZnS (n=2.3), $PbCl_2$ (n=2.3), CdO (n=2.2), $Sb_2O_3$ (n=2.0), $WO_3$ (n=2.0), SiO (n=2.0), $Si_2O_3$ (n=2.5), $In_2O_3$ (n=2.0), PbO (n=2.6), $Ta_2O_3$ (n=2.4), ZnO (n=2.1), $ZrO_2$ (n=2.2), SnO (n=2.0), TIO (indium tin oxide; n=2.0), MgO (n=1.6), $SiO_2$ (n=1.5), $MgF_2$ (n=1.4), $CeF_3$ (n=1.6), $CaF_2$ (n=1.3 to 1.4), $AlF_3$ (n=1.6), $Al_2O_3$ (n=1.6), and GaO (n=1.7).

The first transparent inorganic compound is preferred to have a refractive index having a large difference from that of the first transparent material. The second transparent inorganic compound is preferred to have a refractive index having a large difference from that of the second transparent material. If the difference in refractive index is large, reflectance at the interface between the nuclei and the coating becomes higher.

The first and second transparent inorganic compounds may be the same compound or may be different compounds. In the case of the former, the second and fourth coatings are ensured to have different thicknesses so that they have different optical thicknesses. In the case of the latter, the second and fourth coatings may have thicknesses equal to or different from each other. In either of the cases, the second and fourth coatings have different optical thicknesses at any wavelength in the visible range. It should be noted that the optical thickness of a layer is a product of the refractive index n of the material of the layer and the thickness d of the layer as expressed by n×d. The refractive index n is a refractive index with respect to light having a wavelength of 550 nm. The second and fourth coatings are preferred to have an optical thickness in the range of 100 nm to 900 nm.

The first coating does not necessarily have to be made of iron(III) oxide as long as it is a layer formed of a first coloring material covering the first nuclei. The third coating does not necessarily have to be made of iron(III) oxide as long as it is a layer formed of a second coloring material covering the second coating and can pass light therethrough that causes strong interference in the second coating. The fifth coating does not necessarily have to be made of iron(III) oxide as long as it is a layer formed of a third coloring material covering the fourth coating and can pass light therethrough that causes strong interference in the fourth coating.

The first to third coloring materials may be, for example, iron oxide such as iron(III) oxide, copper oxide such as copper(I) oxide, cobalt oxide such as cobalt(II) oxide, chromium oxide such as chromium(VI) oxide, and nickel oxide such as nickel(II) oxide. The same material may be used for the first to third coloring materials, or the first to third coloring materials may be different from each other. It is preferred that the same material is used for the first to third coloring materials. It is preferred that the first to third coloring materials are iron(III) oxide.

The first, third and fifth coatings are each preferred to have an optical thickness of 250 nm or less, and more preferably 210 nm or less. If the optical thickness increases, transmittance for visible light may lower and consequently the structural color is less likely to be visible. For example, if the first, third and fifth coatings are made of iron oxide (refractive index n=3.0), they are preferred to have a geometric thickness of 80 nm or less, and more preferably 50 nm or less.

The first, third and fifth coatings are preferred to have an optical thickness of 50 nm or more, and more preferably 70 nm or more. For example, if the first, third and fifth coatings are made of iron oxide (refractive index n=3.0), they are preferred to have a geometric thickness of 20 nm or more, and more preferably 25 nm or more.

The optical thicknesses of the first, third and fifth coatings may be equal to or different from each other. It is more preferred that the first, third and fifth coatings have optical thicknesses equal to each other.

The first to third color inks or the first to third color ink panels may further contain a fluorescent material. The fluorescent material may be dispersed in a binder. Examples of the fluorescent material may include blue fluorescent materials such as 1,1,4,4-tetraphenyl-1,3 butadiene and poly (9,9-dialkylfluorene); green fluorescent materials such as coumarin pigments, quinacridone pigments, poly(p-phenylene vinylene), and poly(fluorene); and red fluorescent materials such as 4-dicyanomethylene-4H-pyran derivatives, 2,3-diphenylfumaronitrile derivatives, and coumarin pigments.

Specific examples of the present invention will be described below.

Example 1

(Preparation of Color Pigments)
[First Color Pigment]
The following first color pigment was prepared.
Iron(III) Oxide/Synthetic Mica
This first color pigment was obtained by covering first nuclei made of synthetic mica (synthetic glass) with a first coating made of iron(III) oxide. The first color pigment exhibited a reddish brown color that was the color of the iron(III) oxide at any observation angle.
[Preparation of Second Color Pigment]
The following second color pigment was prepared.
Iron(III) Oxide/Titanium Oxide/Synthetic Mica
This second color pigment was obtained by covering second nuclei made of synthetic mica (synthetic glass) with a second coating made of titanium oxide, and further covering the second coating with a third coating made of iron(III) oxide.

(Preparation of Thermal Transfer Medium)

A polyethylene terephthalate (PET) film with a thickness of 12 μm was prepared as a support. An ink containing a polyester resin as a binder resin and a pigment was applied to one surface of this film using a gravure coater, followed by forming thereon color ink panels of four colors respectively containing cyan, magenta, yellow and black pigments, a first color ink panel formed of a first color ink containing a first color pigment, and a second color ink panel formed of a second color ink containing a second color pigment. The compositions of the inks used for forming these ink panels were as follows. The color ink panels formed were ensured to have a dry thickness of 1.0 μm, the first color ink panel formed was ensured to have a dry thickness of 1.0 μm, and the second color ink panel formed was ensured to have a dry thickness of 1.5 μm. In this manner, a thermal transfer medium was obtained. It should be noted that, in the compositions shown below, MEK refers to methyl ethyl ketone.

| | |
|---|---|
| Cyan pigment | 5 parts by mass |
| Vylon (trademark) 500 (manufactured by Toyobo Co., Ltd) | 15 parts by mass |
| MEK (Toyo Ink Co., Ltd.) | 80 parts by mass |

| | |
|---|---|
| Magenta pigment | 5 parts by mass |
| Vylon (trademark) 500 (manufactured by Toyobo Co., Ltd) | 15 parts by mass |
| MEK (Toyo Ink Co., Ltd.) | 80 parts by mass |

| | |
|---|---|
| Yellow pigment | 5 parts by mass |
| Vylon (trademark) 500 (manufactured by Toyobo Co., Ltd) | 15 parts by mass |
| MEK (Toyo Ink Co., Ltd.) | 80 parts by mass |

| | |
|---|---|
| Carbon black pigment | 5 parts by mass |
| Vylon (trademark) 500 (manufactured by Toyobo Co., Ltd) | 15 parts by mass |
| MEK (Toyo Ink Co., Ltd.) | 80 parts by mass |

| | |
|---|---|
| First luminescent pigment | 5 parts by mass |
| Vylon (trademark) 500 (manufactured by Toyobo Co., Ltd) | 15 parts by mass |
| MEK (Toyo Ink Co., Ltd.) | 80 parts by mass |

| | |
|---|---|
| Second luminescent pigment | 5 parts by mass |
| Vylon (trademark) 500 (manufactured by Toyobo Co., Ltd) | 15 parts by mass |
| MEK (Toyo Ink Co., Ltd.) | 80 parts by mass |

(Preparation of Intermediate Transfer Film)

An ink containing an epoxy resin was applied to one surface of a PET film with a thickness of 12 μm using a gravure coater to form an overlay layer with a thickness of 0.8 μm. Thus, an intermediate transfer film was obtained. The composition of the ink used for forming the overlay layer is as follows.

| [Composition of ink for forming overlay layer] | |
|---|---|
| jER1003 (manufactured by Mitsubishi Chemical Corporation) | 20 parts by mass |
| MEK (Toyo Ink Co., Ltd.) | 80 parts by mass |

(Preparation of Information Recording Body)

Using the thermal transfer medium and the intermediate transfer film prepared as described above, a pattern similar to the pattern shown in FIG. 10A as an example was printed on one surface of a card-shaped recording medium formed of vinyl chloride. For this printing, a card printer CP500 (Toppan Inc.) that was an indirect transfer recording type printer was used. In this manner, an information recording body was obtained.

(Verification)

This information recording medium was visually observed. When this information recording body was observed in a direction perpendicular to the front surface, the first and second color patterns both appeared reddish brown and could not be distinguished from each other. When this information recording body was observed at an inclination of about 30°, the first color pattern remained reddish brown. On the other hand, the second color pattern exhibited a green color. Consequently, a T-shaped image became visible. In other words, there was formed a color pattern that could display images changing between latent images and manifest images with the change of the observation angle. In the information recording body, the portion corresponding to the first color pattern and the portion corresponding to the second color pattern were not different in texture, and the fact that two types of color patterns were provided was not noticed by persons who were not expecting the color change to occur and who had not experienced the color change before.

Example 2

(Preparation of Color Pigments)
[Second Color Pigment]

A second color pigment was prepared similarly to Example 1.
[Third Color Pigment]

The following third color pigment was prepared.
Iron(III) Oxide/Silicon Dioxide/Synthetic Mica This third color pigment was obtained by covering third nuclei made of synthetic mica (synthetic glass) with a fourth coating made of silicon dioxide, and further covering the fourth coating with a fifth coating made of iron(III) oxide.

(Preparation of Thermal Transfer Medium)

A polyethylene terephthalate (PET) film with a thickness of 12 μm was prepared as a support. An ink containing a polyester resin as a binder resin and a pigment was applied to one surface of this film using a gravure coater, followed by forming thereon color ink panels of four colors respectively containing cyan, magenta, yellow and black pigments, a second color ink panel formed of a second color ink containing a second color pigment, and a third color ink panel formed of a third color ink containing a third color pigment. The compositions of the inks used for forming these ink panels were as follows. The color ink panels formed were ensured to have a dry thickness of 1.0 μm, the second color ink panel formed was ensured to have a dry thickness of 1.5 μm, and the third color ink panel formed was ensured to have a dry thickness of 1.8 μm. In this manner, a thermal transfer medium was obtained.

[Compositions of Cyan, Magenta, Yellow and Black Inks]

The compositions of cyan, magenta, yellow and black inks were similar to those of Example 1.

[Composition of Second Color Ink]

The composition of the second color ink was similar to that of Example 1.

| | |
|---|---|
| Third luminescent pigment | 5 parts by mass |
| Vylon (trademark) 500 (manufactured by Toyobo Co., Ltd) | 15 parts by mass |
| MEK (Toyo Ink Co., Ltd.) | 80 parts by mass |

(Preparation of Intermediate Transfer Film)

An intermediate transfer film similar to Example 1 was prepared.

(Preparation of Information Recording Body)

Using the thermal transfer medium and the intermediate transfer film prepared as described above, a pattern similar to the pattern shown in FIG. 11A as an example was printed on one surface of a card-shaped recording medium formed of vinyl chloride. For this printing, a card printer CP500 (Toppan Inc.) that was an indirect transfer recording type printer was used. In this manner, an information recording body was obtained.

(Verification)

This information recording medium was visually observed. When this information recording body was observed in a direction perpendicular to the front surface, the second and third color patterns both appeared reddish brown and could not be distinguished from each other. When this information recording body was observed at an inclination of about 30°, the second and third color patterns both exhibited a green color. When this information recording body was observed at a further inclination up to about 60°, the third color pattern remained green, but the second color pattern exhibited a blue color. Consequently, a T-shaped image became visible. In other words, there was formed a color pattern that could display images changing between latent images and manifest images with the change of the observation angle. In the information recording body, the portion corresponding to the second color pattern and the portion corresponding to the third color pattern were not different in texture, and the fact that two types of color patterns were provided was not noticed by persons who were not expecting the color change to occur and who had not experienced the color change before.

[Reference Signs List] 1 . . . Thermal transfer medium; 2 . . . Support; 3 . . . Thermal transfer medium; 4 . . . Support; 5 . . . Unwinding roll; 6 . . . Take-up roll; 7 . . . Thermal head; 8 . . . Intermediate transfer film; 9 . . . Unwinding roll; 10 . . . Take-up roll; 11 . . . Heat roller; 12 . . . Platen roller; 13 . . . Recording medium; 14 . . . Information recording body; 14' . . . Information recording body; 14" . . . Information recording body; 15 . . . Pattern; 16 . . . color pattern; 16' . . . color pattern; 16" . . . color pattern; 17 . . . Overlay layer; 18 . . . Adhesive layer; 100 . . . Indirect transfer recording device; 101 . . . Primary transfer section; 102 . . . Secondary transfer section; A . . . First color ink panel; A1 . . . Image; B . . . Second color ink panel; B1 . . . Image; B2 . . . Image; B3 . . . Image; Bk . . . Ink panel; C . . . Third color ink panel; C1 . . . Image; C2 . . . Image; C2a . . . Curve; C2b . . . Curve; C21 . . . Curve; C3a . . . Curve; C3b . . . Curve; C31 . . . Curve; Cy . . . Ink panel; Ma . . . Ink panel; P . . . Information recording body; PA . . . First color pattern; PB . . . Second color pattern; PBk . . . Pattern; PC . . . Third color pattern; PCy . . . Pattern; PMa . . . Pattern; PYe . . . Pattern; S . . . Sensor mark; Ye . . . Ink panel.

What is claimed is:

1. A thermal transfer medium, comprising:
a support; and
a plurality of ink panels individually provided on the support and each made of a thermal transfer ink, wherein
the plurality of ink panels comprise
a first ink panel in which the thermal transfer ink is a first ink containing a first pigment as a color material, the first pigment consists of first flake nuclei made of synthetic mica, and a first coating made of iron(III) oxide and covering the first nuclei,
a second ink panel in which the thermal transfer ink is a second ink containing a second pigment as a color material, the second pigment consists of second flake nuclei made of synthetic mica, a second coating made of titanium dioxide and covering the second nuclei, and a third coating made of iron(III) oxide and covering the second coating, and
a third ink panel in which the thermal transfer ink is a third ink containing a third pigment as a color material, the third pigment consists of third flake nuclei made of synthetic mica, a fourth coating made of silicon dioxide and covering the third nuclei, and a fifth coating made of iron(III) oxide covering the fourth coating, the fourth coating being different from the second coating in optical thickness, wherein the first ink remains unchanged in color with a change of an observation angle θ, the second ink has a reddish brown color of the iron(III) oxide at the observation angle of 0° to 15°; a green color at the observation angle of 30° and a blue color at the observation angle of 60°; and the third ink has a reddish brown color of the iron(III) oxide at the observation angle of 0° to 15°; a green color at the observation angle of 30° and a green color at the observation angle of 60°.

2. A thermal transfer medium in the form of a roll, comprising:
a support; and
a plurality of ink panels individually provided on the support and each made of a thermal transfer ink, wherein
the plurality of ink panels comprise
a first ink panel in which the thermal transfer ink is a first ink containing a first pigment as a color material, the first pigment consists of first flake nuclei made of synthetic mica, and a first coating made of iron(III) oxide and covering the first nuclei,
a second ink panel in which the thermal transfer ink is a second ink containing a second pigment as a color material, the second pigment consists of second flake nuclei made of synthetic mica, a second coating made of titanium dioxide and covering the second nuclei, and a third coating made of iron(III) oxide and covering the second coating, and
a third ink panel in which the thermal transfer ink is a third ink containing a third pigment as a color material, the third pigment consists of third flake nuclei made of synthetic mica, a fourth coating made of silicon dioxide and covering the third nuclei, and a fifth coating made of iron(III) oxide covering the fourth coating, the fourth coating being different from the second coating in optical thickness, wherein the first ink remains unchanged in color with a change of an observation angle θ, the second ink has a reddish brown color of the iron(III) oxide at the observation angle of 0° to 15°; a green color at the observation angle of 30° and a blue color at the observation angle of 60°; and the third ink has a reddish brown color of the iron(III) oxide at the observation angle of 0° to 15°; a green color at the observation angle of 30° and a green color at the observation angle of 60°.

\* \* \* \* \*